United States Patent [19]

Myers

[11] 4,008,613
[45] Feb. 22, 1977

[54] VIBRATORY BIN LEVEL INDICATORS

[75] Inventor: Donald M. Myers, Berrien Springs, Mich.

[73] Assignee: Ludlow Industries, Inc., Batavia, Ill.

[22] Filed: Oct. 3, 1975

[21] Appl. No.: 619,524

[52] U.S. Cl. .......................... 73/290 V; 340/244 R; 340/366 R
[51] Int. Cl.$^2$ ....................................... G01F 23/28
[58] Field of Search .......... 73/290 V, 54, 59, 67.4, 73/67.3; 340/244 R, 366 R

[56] References Cited

UNITED STATES PATENTS

| | | | |
|---|---|---|---|
| 3,147,612 | 9/1964 | Evans | 73/59 |
| 3,312,107 | 4/1967 | Burns et al. | 73/290 V |
| 3,382,706 | 5/1968 | Fitzgerald et al. | 73/54 X |
| 3,693,445 | 9/1972 | Johnson | 73/290 V |

FOREIGN PATENTS OR APPLICATIONS

| | | | |
|---|---|---|---|
| 839,092 | 6/1960 | United Kingdom | 73/290 V |

*Primary Examiner*—Donald O. Woodiel
*Assistant Examiner*—Daniel M. Yasich
*Attorney, Agent, or Firm*—Burmeister, York, Palmatier, Hamby & Jones

[57] ABSTRACT

A vibratory system is provided on a wall member of a receptacle. The vibratory system comprises inner and outer rod elements projecting transversely from the inner and outer sides of the wall member and secured thereto, as by an internal screw stud with the axes of the rod members substantially aligned. Vibrations are induced in the outer rod element by an electromagnet having a coil which is supplied with low frequency electrical pulses. The magnitude of such vibrations is sensed by sensing the electrical signals induced in the coil due to such vibrations. A biasing magnetic flux is produced between the electromagnet and the outer rod element so that the vibrations produce variations in the magnetic flux. The electrical pulses supplied to the coil are at a substantially lower frequency than the natural vibration frequency of the outer rod element. Such electrical signals may be supplied through an amplifier to a comparator for comparing the level of the amplified signals with a reference level, and causing operation of an output device, according to whether or not the level of the amplified signals exceeds the reference level. The amplifier may be gated so that it is inactive during the vibration inducing pulses, while being active during the intervals between such pulses. When the flowable material in the bin or other receptacle engages the inner rod element, the vibrations of the outer rod element are reduced in magnitude. This reduction causes a change in the state of the output device, which may be in the form of an electrical relay adapted to operate a warning device, or to perform any desired control functions.

9 Claims, 7 Drawing Figures

VIBRATORY BIN LEVEL INDICATORS

This invention relates to level indicators for indicating the level of a flowable material in a bin or other receptacle. Such level indicators may be employed to operate warning devices, or to perform any desired control functions, when the flowable material in the bin or other receptacle rises or falls to any particular level.

One object of the present invention is to provide a new and improved level indicator of the vibratory type, in which the magnitude of the vibrations in a vibratory system is reduced by the engagement of the flowable material with a member of the vibratory system.

Another object is to provide a new and improved vibratory level indicator which can be mounted very easily and quickly on one wall of a bin or other receptacle, and in which the vibratory system is extremely simple and inexpensive in construction.

A further object is to provide a new and improved vibratory level indicator, having improved means for inducing vibrations in the vibratory system, and improved means for sensing the magnitude of the vibrations.

The objects of the present invention can be achieved by providing a vibratory system including inner and outer rod elements secured to an extending transversely from the inner and outer sides of a wall member, which is adapted to form a wall element of a bin or other receptacle. The rod elements are preferably clamped against the wall member by a screw stud which extends through an opening in the wall member and is threaded into openings in the rod elements. The level indicator includes vibration inducing means for causing vibrations of the outer rod element and thereby causing sympathetic vibrations of the inner rod element, due to the vibratory coupling between the inner and outer rod elements. The level indicator also includes sensor means for sensing the magnitude of the vibrations of the outer rod element. When the flowable material engages the inner rod element, the magnitude of such vibrations is reduced. An output device can be operated by the sensor means in response to such reduction.

In one embodiment, the vibration inducing means includes an electromagnet having a core closely spaced from the outer rod element. The core extends within a coil which is supplied with electrical pulses, preferably at a low frequency, substantially lower than the natural vibration frequency of the outer rod element.

The coil of the electromagnet can also be used in connection with the sensor means, to provide electrical signals corresponding to the vibrations of the outer rod element. To provide for the induction of such electrical signals, a biasing magnetic flux is produced between the electromagnet and the outer rod element. Such biasing magnetic flux is preferably provided by a permanent magnet, but may also be provided by a biasing electrical current in the coil or in another coil adjacent the first coil. The signals from the coil may be supplied through an amplifier to a comparator, which compares the level of the amplified signals with a reference level and operates an output device, depending upon whether or not the signal level exceeds the reference level. It is preferred to supply gating pulses to inactivate the amplifier during the vibration inducing pulses, while activating the amplifier during intervals between such pulses. Further objects, advantages and features of the present invention will appear from the following description, taken with the accompanying drawings:

As just indicated, the drawings illustrate a level indicator 10 to be described as an illustrative embodiment of the present invention. The level indicator 10 is particularly well adapted for indicating the level of a dry flowable material 12 in a bin 14, but the level indicator is applicable to any liquid or solid flowable material, contained in any tank, bin or other receptacle. The flowable material 12 may be granular, powdered or otherwise finely divided, so that the material will flow into and out of the bin 14.

The bin level indicator 10 provides an electrical signal when the flowable material 12 rises to a particular elevation in the bin 14. A different electrical signal is produced when the flowable material 12 recedes below such elevation. These electrical signals may be employed to actuate any desired alarm device, and may also be employed to initiate a wise variety of control functions. For example, the signals from the bin level indicator 10 may be employed to control the operation of a machine or device which is being utilized to cause the flow of the flowable material into or out of the bin 14.

The illustrated bin level indicator 10 comprises a vibratory system 16 having inner and outer vibratory elements 18 and 20, adapted to be positioned inside and outside of the bin 14. The vibratory elements 18 and 20 are mounted on and extend transversely to a wall member 22, adapted to serve as one wall element of the bin 14. The wall member 22 may be formed integrally with any desired wall 24 of the bin 14. However, in this case, the wall member 22 is in the form of a separate plate, adapted to be removably mounted on the wall 24, so as to close a small opening 26 in the wall 24. This arrangement makes it easy to install the level indicator 10 on the bin 14. The illustrated wall member 22 is in the form of a plate, which is preferably made of metal, such as twelve guage sheet steel. As shown, screws or other fasteners 28 may be employed to secure the plate 22 to the bin wall 24, so as to close the opening 26.

The illustrated vibratory elements 18 and 20 take the form of rod elements, secured to the inner and outer sides 30 and 32 of the wall member 22. The rod elements 18 and 20 preferably extend along a common axis, perpendicular or transverse to the wall member 22.

Figures 1, 2:
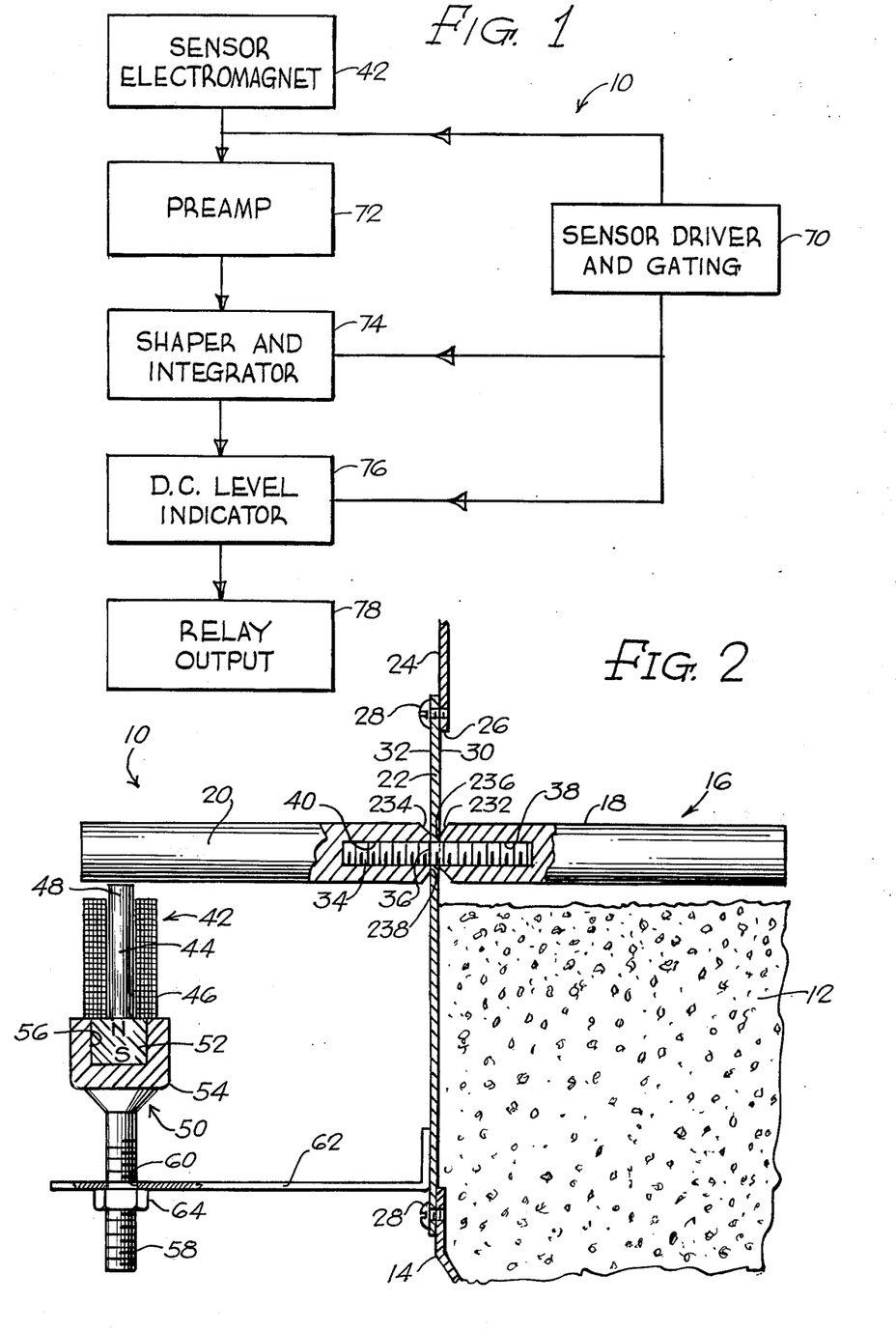
FIG. 1 is a block diagram illustrating a level indicating device to be described as an illustrative embodiment of the present invention.
FIG. 2 is a diagrammatic elevational view, partly in section, showing a vibratory system and a transducer employed in the level indicator of FIG. 1.

As illustrated in FIG. 2, the rod elements 18 and 20 are secured to the wall member 22 by an externally threaded screw stud 34, extending through an opening 36 in the wall member 22, and screwed into internally threaded openings 38 and 40 in the rod elements 18 and 20. The rod elements 18 and 20 are securely tightened on the screw stud 34, so that the rod elements will be firmly clamped against the inner and outer sides 30 and 32 of the wall member 22.

Resilient support for the rod elements 18 and 20 is provided by the wall member 22. Due to this common resilient support, there is mutual vibratory coupling between the rod elements 18 and 20. If either rod element 18 or 20 is set in vibration, sympathetic vibrations will also be produced in the other rod element, due to the mutual vibratory coupling between the elements.

The level indicator 10 includes means for inducing vibrations of the outer rod element 20, which is readily accessible, because it is outside the bin 14. The vibrations of the outer rod element 20 cause resilient flexure of the wall member 22, so that sympathetic vibrations of the inner rod element 18 are also produced. If the flowable material 12 in the bin 14 is below the level of the inner rod element, the material has no appreciable effect upon the vibrations of the inner rod element 18. If the flowable material 12 rises to such an extent that the material comes into engagement with the inner rod element 18, the vibrations of the inner rod element 18 are substantially reduced, due to the dampening effect of the flowable material. This reduction in the vibrations of the inner rod element 18 produces a corresponding reduction in the vibrations of the outer rod element 20.

The level indicator 10 includes means for sensing or measuring the magnitude of the vibrations of the outer rod element 20. A high level of vibrations is sensed when the flowable material 12 is out of engagement with the inner rod element 18. On the other hand, a lower level of vibrations is sensed when the flowable material 12 rises in the bin 14 so as to come into engagement with the inner rod element 18.

As shown in FIG. 2, the bin level indicator 10 includes vibration inducing means in the form of an electromagnet 42 having a core 44 within a coil 46. The core 44 is preferably made of soft iron or steel, or some other material having low magnetic reluctance. The coil 46 may comprise a large number of turns of wire. For example, the coil 46 may comprise approximately 2,000 turns of No. 31 gauge copper wire insulated with enamel.

The core 44 has a pole portion 48 which is closely spaced from the outer end portion of the outer rod element 20. For example, the spacing may be about 0.025 of an inch.

The outer rod element 20 is made of magnetically attractable material, at least in the region opposite the pole portion 48 of the core 44. For example, the outer rod element 20 may be made of soft iron or steel, or some other material having low magnetic reluctance.

As will be explained in greater detail presently, vibrations are induced in the outer rod element 20 by supplying electrical pulses to the coil 46, so as to produce impulses of force between the electromagnet 42 and the outer rod element 20. The force impulses induce vibrations of the outer rod element 20 at or near its natural vibratory frequency.

To sense such vibrations, the level indicator 10 includes sensor means 50, utilizing the electromagnet 42 as an important component. The sensing means 50 also comprises magnetic biasing means 52 for producing a magnetic biasing flux between the electromagnet 42 and the outer rod element 20. Any vibrations of the outer rod element 20 produce variations in the magnetic flux. As a result, electrical signals are induced in the coil 46. Such electrical signals correspond with the vibrations of the outer rod element 20.

Thus, the electromagnet 42 serves as a driving transducer for producing vibrations of the outer rod element 20, and as a sensing transducer for producing electrical signals corresponding to the vibrations of the outer rod element 20.

As shown in FIG. 2, the magnetic biasing means 52 is in the form of a permanent magnet, which may be made of Alnico V, or some other material capable of retaining a high degree of permanent magnetism. The core 44 of the electromagnet 42 preferably engages the permanent magnet 52, so that the permanent magnet produces a magnetic flux in the core 44. Some of this magnetic flux extends between the pole portion 48 and the outer rod element 20.

In the level indicator 10 of FIG. 2, the permanent magnet 52 is provided with an adjustable support, in the form of a generally cup-shaped member 54 having a cavity 56 for receiving the permanent magnet 52. Both the permanent magnet 52 and the supporting member 54 may be generally cylindrical in shape. The supporting member 54 may be fitted with an axial stem in the form of an externally threaded screw member 58. The supporting member 54 and the screw stem 58 may be made of soft iron or steel.

To provide for adjustment of the screw 58, it is preferably received in an internally threaded opening 60 in a fixed member or bracket 62. A locknut 64 may be mounted on the screw 58 for clamping engagement with the bracket 62, to maintain the adjustment of the screw 58.

The electromagnet 42 is suitably secured to the permanent magnet 52. For example, clamping means may be employed. In the arrangement of FIG. 2, however, a strong adhesive is simply employed between the electromagnet 42 and the permanent magnet 52.

FIG. 1 constitutes an electrical block diagram, showing the general layout of the electrical circuits for the level indicator 10. As previously indicated, the electromagnet 42 serves as a sensor or transducer which is supplied with electrical pulses to produce vibrations of the outer rod element 20. As shown in FIG. 1, the electrical pulses are supplied to the sensor or electromagnet 42 by a driver 70. The electrical pulses are preferably at a low frequency, substantially below the natural vibratory frequency of the outer rod element 20. The vibrations of the outer rod element 20, at its natural vibratory frequency, produce induced electrical signals in the sensor 42.

Such signals are amplified by a preamplifier 72. The amplified signals are supplied to a shaper and integrator 74, which produces an integrated output corresponding to the magnitude of the amplified signals.

The integrated output is supplied to a direct current level detector 76 which determines whether or not the integrated output exceeds a predetermined level. The level detector 76 controls the operation of a relay output stage 78, which causes a relay to switch between two different positions, depending upon whether or not the integrated signal output exceeds the predetermined level. Thus, the relay is switched to one position if the flowable material 12 in the bin 14 engages the inner rod element 18, and to a different position if the flowable material does not engage the rod element 18.

Preferably, the driver 70 also supplies gating pulses to the signal processing stages 74 and 76, so that these stages will be inactivated during the driving pulses, while being activated during the intervals between the driving pulses. In this way, the driving pulses are prevented from interfering with the proper operation of the relay output.

Figures 5, 6:
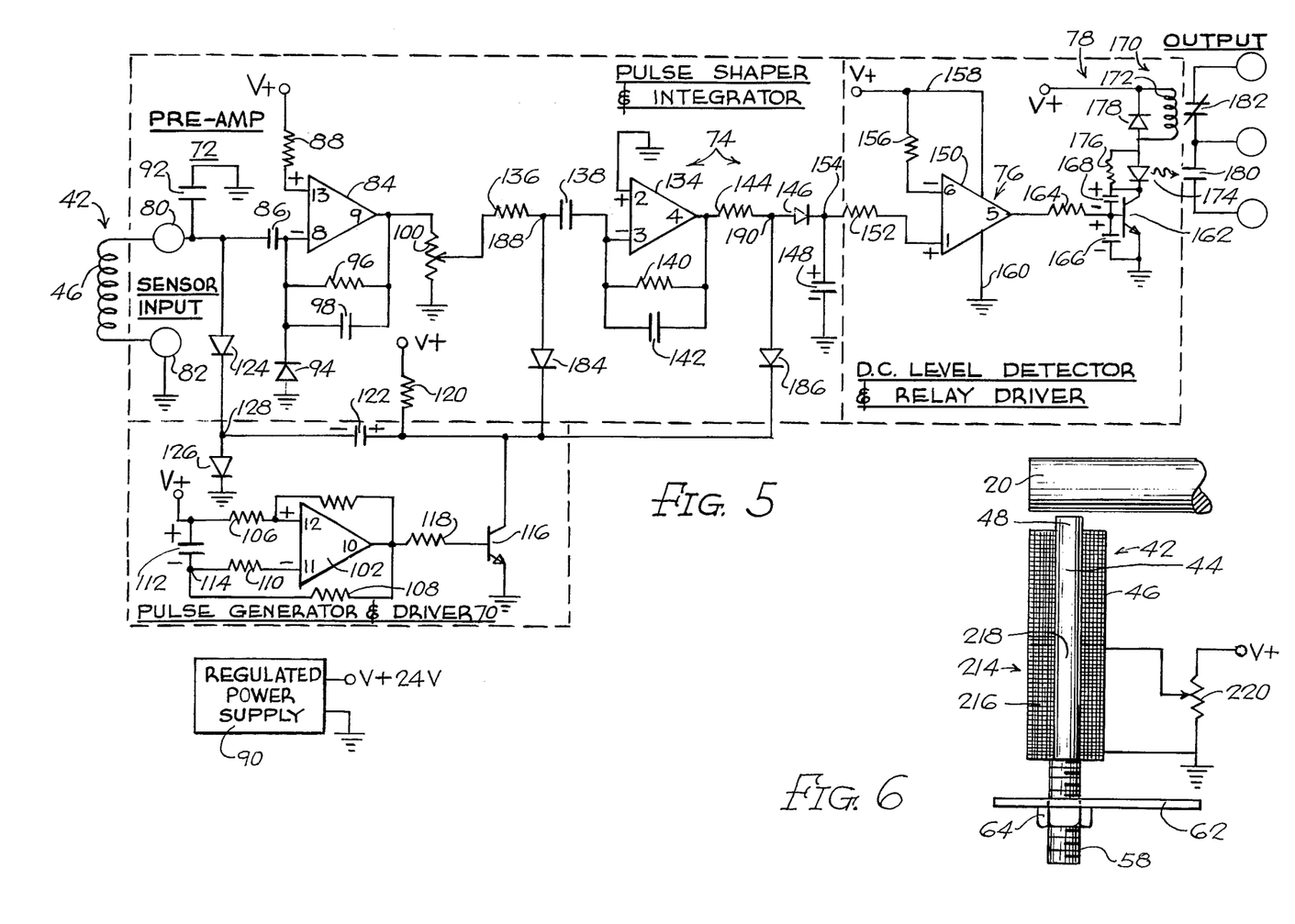
FIG. 5 is a schematic electrical circuit diagram for the level indicator.
FIG. 6 is a fragmentary view corresponding to a portion of FIG. 2 and illustrating another modified transducer utilizing an electromagnet instead of a permanent magnet.

The details of the preferred electrical circuits are shown in FIG. 5. The coil 46 of the electromagnet 42 is connected to the input terminals 80 and 82 of the preamplifier 72, which utilizes a differential or operational amplifier module 84. In this instance, the amplifier 84 is preferably of the current amplifying type. A coupling capacitor 86 may be connected between the input terminal 80 and the inverting input of the amplifier 84. The other input terminal 82 is grounded. In this case, the noninverting input of the amplifier 84 is supplied with a fixed current through a current limiting resistor 88, connected to a power supply terminal V+. The positive voltage on the terminal V+ may be at approximately 24 volts and may be supplied by a regulated power supply 90. As shown, a high frequency bypassing capacitor 92 is connected between the input terminal 80 and ground.

In the preamplifier 72 of FIG. 5, a clamping diode 94 is connected between the inverting input of the amplifier 84 and ground.

Negative feedback is provided by a resistor 96 in parallel with a capacitor 98, connected between the output and the inverting input of the amplifier 94. A sensitivity control is provided by a potentiometer 100, connected between the output of the amplifier 84 and ground. The amplified signals appearing at the slider of the potentiometer 100 correspond to the vibrations of the outer rod element 20.

As previously indicated, such vibrations are induced by electrical pulses supplied to the coil 46 of the electromagnet 42. In the circuits of FIG. 5, the pulse generator and driver stage 70 employs a differential or operational amplifier 102 to generate the electrical pulses. Positive feedback is provided by a resistor 104 connected between the output and the noninverting input of the amplifier 102. A current limiting resistor 106 is connected between the noninverting input and the positive power supply terminal V+. Negative feedback is provided by resistors 108 and 110 connected in series between the output of the amplifier 102 and the inverting input. A timing capacitor 112 is connected between the positive power supply terminal V+ and the junction 114 between the resistors 108 and 110.

With this arrangement, the amplifier 102 produces an unequal square wave output. Each cycle of the square wave may comprise a relatively brief triggering pulse followed by a relatively long waiting interval. For example, the duration of the triggering pulse may be about 5 milliseconds, while the the duration of the waiting interval may be about 55 milliseconds. The repetition rate of the square wave pulses may be relatively low, only about 17 cycles per second in the example given. This repetition rate is considerably lower than the natural vibratory frequency of the outer rod element 20.

The pulses from the output of the amplifier 102 are supplied to the base of a driver transistor 116 through a resistor 118. The emitter of the transistor 116 is grounded, while the collector is connected through a load resistor 120 to the positive power supply terminal V+. When the transistor 116 is conductive, the collector voltage is low, virtually zero. When the transistor 116 is not conductive, the collector voltage rises toward the power supply voltage.

The driving pulses are supplied from the collector of the transistor 116 to the terminal 80 of the coil 46 through a driving capacitor 122 and a diode 124. Another diode 126 is connected between ground and the junction 128 between the capacitor 122 and the diode 124. It will be seen that the diodes 124 are effectively in series across the terminals 80 and 82. The diodes 124 and 126 are polarized to conduct positive currents between the terminals 80 and 82.

When the transistor 116 is nonconductive, the capacitor 122 is charged from the power supply terminal V+ through the load resistor 120 and the diode 126. When the transistor 116 is rendered conductive by the next pulse from the amplifier 102, the capacitor 122 is discharged through the coil 46, because the transistor completes a series circuit comprising the capacitor 122, the transistor 116, the ground conductor system, the coil 46 and the diode 124. The discharge of the capacitor 122 produces a current pulse in the coil 46 of the electromagnet 42, so that an impulse of force is produced between the electromagnet and the outer rod element 20.

This impulse of force produces vibrations of the rod element 20 at its natural vibratory frequency. Such vibrations produce corresponding electrical signals in the coil 46. These electrical signals are amplified by the amplifier 84. The adjustable output of the amplifier 84 appears at the slider of the potentiometer 100.

The signals from the slider of the potentiometer 100 are supplied to the pulse shaper and integrator stage 74. As shown in FIG. 5, the stage 74 utilizes a differential or operational amplifier module 134 which again is preferably of the current amplifying type. A resistor 136 and a coupling capacitor 138 are preferably connected in series between the slider of the potentiometer 100 and the inverting input of the amplifier 134. The noninverting input is grounded. Negative feedback is provided by a resistor 140 and a capacitor 142, connected in parallel between the output of the amplifier 134 and the inverting input.

The amplifier 134 produces an amplified output signal which is rectified and integrated by a circuit comprising a resistor 144, a diode 146 and a capacitor 148, connected in series between the output of the amplifier 134 and ground. The rectified and integrated output signal appears across the capacitor 148.

This integrated output signal is supplied to the direct current level detector, which employs a comparator circuit, utilizing another differential or operational amplifier module 150, preferably of the current amplifying type. As shown, a current limiting resistor 152 is connected between the noninverting input of the amplifier 150 and the junction 154 between the diode 146 and the capacitor 148. Thus, the integrated output signal produces an input current to the noninverting input of the amplifier 150. A fixed input current is supplied to the inverting input of the amplifier 150 through a resistor 156, connected between the inverting input and the positive power supply terminal V+. A positive power supply lead 158 is also connected between the terminal V+ and the amplifier module 150. A negative power supply lead 160 is connected between the amplifier module 150 and ground.

The amplifier 150 produces an output if the integrated signal current through the resistor 152 exceeds the fixed current through the resistor 156. Thus, the current through the resistor 156 establishes the reference level.

The output from the amplifier 150 is supplied to the relay driver stage 78, which preferably utilizes a transistor 162 having its base connected to the output of the amplifier 150 through a resistor 164. A capacitor 166 is preferably connected between the base of the transistor 162 and ground. Another capacitor 168 is preferably connected between the base and the collector of the transistor 162.

The transistor 162 drives an output relay 170 having a coil 172 connected in a series circuit between the positive power supply terminal V+ and the collector of the transistor 162. This series circuit also preferably includes a light emitting diode 174 which produces light when the relay 170 is energized. In this case, a resistor 176 is connected in parallel with the light emitting diode 174 to reduce the current through the diode.

A diode 178 may be connected in parallel with the relay coil 172 to reduce the inductive voltage which is produced in the coil 172 when the transistor 162 becomes nonconductive. The illustrated relay 170 has a normally open pair of contacts 180 and a normally closed pair of contacts 182. Additional sets of normally open and normally closed contacts may be provided, as needed.

In the level detector circuits of FIG. 5, gating pulses are preferably supplied to the pulse shaping and integrating stage 74 through diodes 184 and 186. The diode 184 is connected between the collector of the transistor 116 and the junction 188 between the resistor 136 and the capacitor 138, in the input circuit for the amplifier 134. The diode 186 is connected between the collector of the transistor 116 and the junction 190 between the resistor 144 and the diode 146. It will be seen that the diodes 184 are polarized to conduct positive current toward the collector of the transistor 116.

It will be recalled that the transistor 116 is conductive when each vibration inducing pulse is supplied to the coil 46 of the electromagnet 42. When the transistor 116 is conductive, the impedance between the collector and ground is very low, as to positive voltages. Due to the provision of the diodes 184 and 186, the impedances to ground at the junctions 188 and 190 is also very low, as to positive signals. Thus, the signal levels at the junctions 188 and 190 are greatly reduced, so that the pulse shaper and integrator stage 74 is effectively gated or switched to a substantially inoperative state.

When the transistor 116 is nonconductive, the positive voltage on the collector of the transistor rises toward the power supply voltage. This positive voltage causes the diodes 184 and 186 to be nonconductive. Thus, the pulse shaper and integrator stage 74 is effectively gated or switched into an operative state.

It may be helpful to summarize the operation of the level indicator 10, as illustrated in FIGS. 1, 2 and 5. The pulse generator and driver stage 70 produces an unequal square wave, comprising a series of relatively brief pulses with relatively long intervals between the pulses. Each pulse results in a pulse of current through the coil 46 of the electromagnet 42. Accordingly, the electromagnet produces an impulse of force upon the outer rod element 20. This impulse causes vibrations of the outer rod element 20, at or near its natural vibratory frequency. Sympathetic vibrations of the inner rod element 18, within the bin 14, are also produced, due to the vibratory coupling between the inner and outer rod elements 18 and 20. The vibratory coupling results from the fact that the rod elements 18 and 20 are resiliently supported by the wall member 22 which is shared in common by the rod elements.

If the flowable material 12 in the bin 14 is out of engagement with the inner rod element 18, the vibrations of the inner rod element 18 are not significantly affected by the flowable material. If the flowable material 12 rises so that it comes into engagement with the inner rod element, the vibrations of the inner rod element are substantially reduced. Due to the coupling between the rod elements 18 and 20, the vibrations of the outer rod element 20 are also substantially reduced.

The vibrations of the outer rod element 20 cause corresponding variations in the magnetic biasing flux produced by the permanent magnet 52, so that electrical signals corresponding to the vibrations are induced in the coil 46 of the electromagnet. These signals are amplified by the amplifier 84 and the associated circuits of the preamplifier stage 72. Further amplification and pulse shaping are produced by the amplifier 134 and the associated circuits of the stage 74. The output of the amplifier 134 is integrated and rectified by the diode 146 and the capacitor 148.

The voltage across the capacitor 148 corresponds to the magnitude of the vibrations of the outer rod element 20. This voltage is compared with a fixed reference voltage by the differential amplifier 150 and the associated circuits of the DC level detector stage 76. If the signal voltage exceeds the reference voltage, the transistor 162 is rendered conductive so that the relay coil 172 is energized. The light emitting diode 174 is also lighted. If the reference voltage exceeds the signal voltage, the transistor 162 is rendered nonconductive, so that the relay coil 172 is deenergized. Moreover, the diode 174 ceases to emit light.

The relay contacts 180 and 182 can be employed to operate alarm devices, or to actuate a conveyor, a gate or any other device for causing the flowable material 12 to flow into or out of the bin 14.

During each of the vibration inducing pulses, the gating diodes 184 and 186 become conductive so that the amplifier 184 and the associated circuits of the pulse shaping and integrating stage 74 are effectively gated or switched into a sutstantially inoperative state. This gating arrangement prevents the vibration inducing pulses from substantially affecting the signal level across the integrating capacitor 148.

The amplifier 84 in the preamplifying stage 72 is preferably biased for linear operation so as to amplify the small signals induced in the sensing coil 46 by the vibrations of the outer rod element 20. The second amplifier 134 in the pulse shaping and integrating stage 74 is set up to receive pulses in a single direction only, so that this amplifier delivers positive output pulses.

The four differential amplifiers 84, 134, 150 and 102 may take the form of a single commercially available integrated circuit module or chip, Type LM3900, manufactured and sold by National Semiconductor Co. The use of this quadruple integrated circuit is highly convenient, but it will be understood that other suitable differential amplifiers may be employed if desired.

Each of the transistors 116 and 162 may be Type No. 2N3414, which is commercially available, but it will be understood that other suitable transistors may be employed. Each of the diodes 94, 124, 126, 146, 178, 184 and 186 may be Type 1N4004, but other suitable diodes may be employed.

Figure 3:
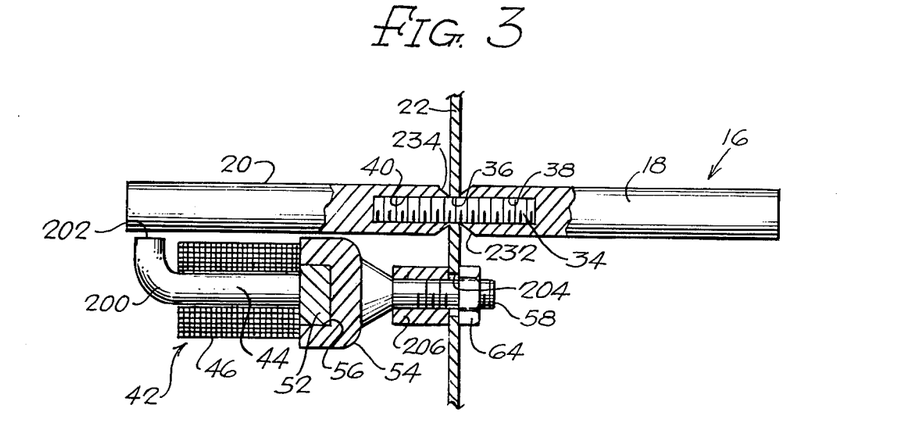
FIGS. 3 and 4 illustrate modified transducers for the level indicator.

FIG. 3 illustrates a modified construction for the electromagnet 42. In this case, the electromagnet has its axis in a generally horizontal position, rather than in a vertical position, as previously illustrated in FIG. 2. The inner and outer rod elements 18 and 20 continue to be in a generally horizontal position, so that the axis of the electromagnet 42 is parallel to the axis of the rod elements 18 and 20, rather than perpendicular, as illustrated in FIG. 2.

To accommodate this changed position of the electromagnet 42, the core 44 of the electromagnet is formed with a generally elbow-shaped pole portion 200 having an upwardly facing end surface 202 which is closely spaced from the outer rod element 20.

The mounting arrangement for the electromagnet 42 is also modified in FIG. 3. In this case, the threaded stem 58 is received in an elongated slot 204, formed in the wall member 22. The threaded stem 58 is clamped to the wall member 22 by the nut 64, acting in opposition to a spacer or sleeve 206, mounted around the threaded member 58 and disposed between the cup-shaped supporting member 54 and the wall member 22. The spacing between the pole surface 202 and the outer rod element 20 can be adjusted by loosening the nut 64 and sliding the threaded stem 58 along the elongated slot 204. The nut 64 is then retightened to maintain the adjustment.

Figures 4, 7:
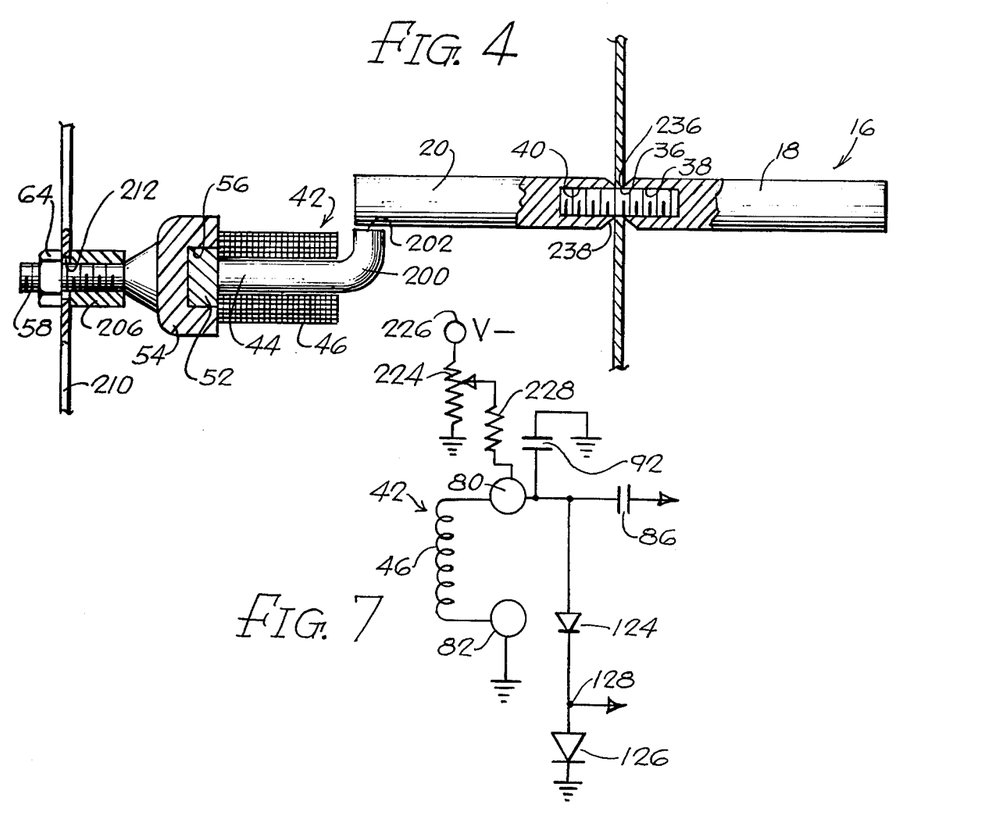
FIG. 7 is a fragmentary schematic circuit diagram, similar to a portion of FIG. 5, but showing a modified construction.

FIG. 4 illustrates another modified construction, which is similar to that of FIG. 3, except that the threaded stem 58 is mounted on a separate wall member or bracket 210 which is parallel to the wall member 22. The threaded stem 58 is received in a slot 212 formed in the wall member 210. The slot 212 makes it possible to adjust the spacing between the pole surface 202 and the outer rod element 20.

In the embodiments of FIGS. 2, 3 and 4, the magnetic biasing flux is provided by the permanent magnet 52. If desired, the magnetic biasing flux can be provided by an electrical current flowing in the coil of an electromagnet.

FIG. 6 illustrates a modified construction in which the permanent magnet 52 has been replaced with a second electromagnet 214 comprising a coil 216 which is received around a core 218. In this case, the core 218 constitutes an extension of the core 44 of the first electromagnet 42. Moreover, the core 218 is formed integrally with the threaded stem 58. The core 218 is preferably made of soft iron or steel, or some other material having low magnetic reluctance.

The coil 216 of the second electromagnet 214 is supplied with an energizing electrical current. As shown in FIG. 6., it is preferred to provide means for regulating the current through the coil 216. For this purpose, a potentiometer 220 is connected between the power supply terminal V+ and ground. The slider of the potentiometer 220 is connected to one end of the coil 216, the other end being grounded. The construction of FIG. 6 has the advantage that the magnetic biasing flux can readily be adjusted by adjusting the potentiometer 220.

FIG. 7 illustrates another modified construction which obviates the need to use a separate magnetic coil to produce the magnetic biasing flux. Instead, a biasing current is employed in the coil 46 of the main electromagnet 42.

FIG. 7 is a fragmentary circuit diagram corresponding to the portion of FIG. 5 which includes the magnet coil 46 and the associated components. As shown, a biasing current is supplied to the coil 46 by connecting a potentiometer 224 between a power supply terminal 226 and ground. The slider of the potentiometer 224 is connected through a resistor 228 to the terminal 80 of the coil 46. As before, the other terminal 82 is grounded. The power supply terminal 226 is also designated V−, indicating that the power supply furnishes a negative voltage to the terminal 226, with respect to ground. The potentiometer 224 may be employed to regulate the biasing current in the coil 46, so as to vary the biasing magnetic flux.

If desired, the biasing current to the coil 46 can be gated, so that it flows only during the listening intervals, between the vibration inducing pulses.

Those skilled in the art will be able to assign suitable values to the various electrical components employed in the level indicator. However, by way of example, it may be helpful to list the following values which have been found to be suitable for the electronic circuits:

| RESISTORS | OHMS, KILOHMS (K) OR MEGOHMS (M) |
|---|---|
| 88 | 1 M |
| 96 | 470 K |
| 100 | 10 K |
| 104 | 1 M |
| 106 | 1 M |
| 108 | 47 K |
| 110 | 100 K |
| 118 | 2.7 K |
| 120 | 1 K |
| 136 | 1 K |
| 140 | 1 M |
| 144 | 47 K |
| 152 | 470 K |
| 156 | 1 M |
| 164 | 10 K |
| 176 | 47 |

| CAPACITORS | MICROFARADS OR PICOFARADS (pf) |
|---|---|
| 86 | .1 |
| 92 | .01 |
| 98 | 470 pf |
| 112 | 2. |
| 122 | 2.2 |
| 138 | .1 |
| 142 | 470 pf |
| 148 | 10 |
| 166 | 2. |
| 168 | 2.2 |

In the vibratory system 16 of FIG. 2, the inner and outer rod elements 18 and 20 are effectively united by the screw stud 34, so that a high degree of coupling is produced between the rod elements. Thus, the rod elements tend to vibrate in unison.

At the ends of the rod elements 18 and 20 which are clamped against the wall member 22, the rod elements are formed with annular surfaces 232 and 234 which are chamfered or tapered. Accordingly, the surfaces 232 and 234 are frusto-conical in shape. Because of the provision of the tapered annular surfaces 232 and 234, the inner and outer rod elements 18 and 20 have end surfaces 236 and 238 of reduced diameter which are in engagement with the wall member 22. The reduced area of engagement increases the effective compliance of resilient support afforded by the wall member 22 for the rod elements 18 and 20, so that the rod elements will vibrate more freely and with greater vibratory coupling between the elements. Thus, when the flowable material 12 engages the inner rod element 18, the dampening effect upon the vibrations is more pronounced, so that the change in the vibrations can be sensed with greater reliability.

I claim:

1. A level indicator for indicating the level of a flowable material in a bin or other receptacle,
   comprising a wall member adapted to form a wall element of the receptacle,
   said wall member having inner and outer sides,
   a vibratory system including an inner rod element extending transversely from said inner side of said wall member,
   an outer rod element extending transversely from said outer side of said wall member,
   and means for securing said inner and outer rod elements to said respective inner and outer sides of said wall member,
   said inner and outer rod elements having axes in substantial alignment,
   said means including a threaded screw stud extending between said inner and outer rod elements for clamping said rod elements against said inner and outer sides of said wall member,
   said wall member having an opening for receiving said stud,
   said rod elements having threaded openings for receiving said stud,
   vibration inducing means for causing vibrations of said outer rod element and thereby causing sympathetic vibrations of said inner rod element,
   sensor means for sensing the magnitude of the vibrations of said outer rod element,
   such magnitude being decreased by any engagement of the flowable material with said inner rod element,
   said outer rod element having a natural vibration frequency,
   said vibration inducing means including impulse means for producing impulses of force upon said outer rod element at a low repetition frequency substantially below said natural vibration frequency,
   said sensor means including means responsive to vibrations at said natural vibration frequency,
   and gating means for causing said sensor means to be inactive during said impulses while causing said sensor means to be active during the intervals between said impulses.

2. A level indicator according to claim 1,
   in which said vibration inducing means includes an electromagnet adjacent said outer rod element and including a coil,
   said outer rod element having magnetically attractable material opposite said electromagnet,
   said impulse means including pulse supply means for supplying brief spaced electrical pulses at said low repetition frequency to said coil for producing said impulses of force,
   said sensor means utilizing said coil and including magnetic biasing means for producing a magnetic biasing flux between said electromagnet and said outer rod element so that electrical signals are induced in said coil corresponding to the vibrations of said outer rod element,
   said sensor means including electrical output control means connected to said coil,
   said gating means including means for causing said electrical output control means to be inactive during said pulses while causing said electrical output control means to be active during the intervals between said pulses.

3. A level indicator according to claim 2,
   in which said electrical output control means includes amplifier means connected to said coil for amplifying said electrical signals induced therein,
   said gating means including means for causing said amplifier means to be inactive during said pulses while causing said amplifier means to be active during the intervals between said pulses.

4. A level indicator according to claim 3,
   in which said electrical output control means includes comparator means connected to the output of said amplifier means for detecting whether the amplified electrical signals from said amplifier means exceed a predetermined value,
   and an output device connected to and operable by the output of said comparator means.

5. A level indicator for indicating the level of a flowable material in a bin or other receptacle,
   comprising a wall member adapted to form a detachable wall element of the receptacle,
   said wall member having inner and outer sides,
   a vibratory system having inner and outer elements on said inner and outer sides of said wall member,
   and coupling means securing said inner and outer elements for coupling vibrations between said inner and outer elements,
   said vibratory system having a natural vibration frequency,
   vibration inducing means including an electromagnet adjacent said outer element and including a coil,
   said outer element having magnetically attractable material opposite said electromagnet,
   pulse supply means for supplying brief low repetition frequency electrical pulses to said coil for causing vibrations of said outer and inner elements at said natural vibration frequency,
   said low repetition frequency being substantially below said natural vibration frequency,
   magnetic biasing means for producing a biasing magnetic flux between said electromagnet and said outer element so that electrical signals are induced in said coil corresponding to said vibrations,
   output control means connected to said coil for producing different outputs depending upon whether or not the induced electrical signals exceed a reference value,
   and gating means supplied with an operable by said electrical pulses for inactivating said output control means for the duration of each of said pulses while activating said output control means during the intervals between said pulses.

6. A level indicator for indicating the level of a flowable material in a bin or other receptacle,
   comprising a wall member adapted to form a detachable wall element of the receptacle,
   said wall member having inner and outer sides,
   a vibratory system having inner and outer elements on said inner and outer sides of said wall member, and coupling means securing said inner and outer elements for coupling vibrations between said inner and outer elements, said vibratory system having a natural vibration frequency, vibration inducing means including an electromagnet adjacent said outer element and including a coil, said outer element having magnetically attractable material opposite said electromagnet, pulse supply means for supplying brief low repetition frequency electrical pulses to said coil for causing vibrations of said outer and inner elements at said natural vibration frequency, said low repetition frequency being substantially below said natural vibration frequency, magnetic biasing means for producing a biasing magnetic flux between said electromagnet and said outer element so that electrical signals are induced in said coil corresponding to said vibrations, amplifier means connected to said coil for amplifying said electrical signals, output means connected to the output of said amplifier means for producing different outputs depending upon whether or not the amplified electrical signals from said amplifier exceed a reference value, and gating means supplied with and operable by said electrical pulses for inactivating said amplifier means for the duration of each of said pulses while activating said amplifier means during the intervals between said pulses.

7. A level indicator according to claim 6,
in which said output means includes comparator means connected to the output of said amplifier means for detecting whether or not the amplified electrical signals from said amplifier exceed said reference value, and an output device connected to and operable by the output of said comparator means.

8. A level indicator according to claim 6,
in which said output means includes integrator means connected to the output of said amplifier means for producing integrated direct current signals corresponding to the amplified electrical signals from said amplifier, comparator means connected to the output of said integrator means for detecting whether or not said integrated direct current signals exceed the reference value, and an output device connected to and operable by the output of said comparator means.

9. A level indicator according to claim 8,
in which said gating means includes means for inactivating said integrator means for the duration of each of said pulses while activating said integrator means during the intervals between said pulses.

* * * * *